US007120968B2

(12) United States Patent
Huene et al.

(10) Patent No.: US 7,120,968 B2
(45) Date of Patent: Oct. 17, 2006

(54) FASTENER SYSTEM AND METHOD FOR BINDING PAPERS

(76) Inventors: Donald R. Huene, 201 N. Valeria, Fresno, CA (US) 93701; William Arthur Huene, 4171 W. Alluvial, Fresno, CA (US) 93722

( * ) Notice: Subject to any disclaimer, the term of this patent is extended or adjusted under 35 U.S.C. 154(b) by 268 days.

(21) Appl. No.: 10/694,850

(22) Filed: Oct. 29, 2003

(65) Prior Publication Data

US 2005/0091799 A1 May 5, 2005

(51) Int. Cl.
*F16B 35/00* (2006.01)
*B42F 3/00* (2006.01)

(52) U.S. Cl. .......................... 24/16 R; 24/67.1; 402/68

(58) Field of Classification Search ................ 24/16 R, 24/16 PB, 67 R, 67 P, 67.1, 605, 662, 591.1, 24/596.1, 595.1, 664; 402/60, 52, 68, 58, 402/61; 281/21.1
See application file for complete search history.

(56) References Cited

U.S. PATENT DOCUMENTS

| | | | | |
|---|---|---|---|---|
| 877,782 | A | 1/1908 | Kriete | |
| 1,817,488 | A | 8/1931 | Irving | |
| 2,439,826 | A * | 4/1948 | Snyder | 402/63 |
| 2,779,984 | A | 2/1957 | Bourgeois | |
| 3,866,274 | A * | 2/1975 | Malavazos | 24/67 P |
| 3,970,331 | A * | 7/1976 | Giulie | 402/68 |
| 4,309,046 | A * | 1/1982 | Giulie | 402/68 |
| 4,606,666 | A * | 8/1986 | Patton | 402/62 |
| 5,096,323 | A * | 3/1992 | Walker | 402/68 |
| 5,226,360 | A * | 7/1993 | Kramka | 24/67.1 |
| 5,320,456 | A | 6/1994 | With | |
| 5,626,432 | A | 5/1997 | Swift et al. | |
| 5,690,443 | A * | 11/1997 | Sullivan | 402/60 |
| 5,988,925 | A | 11/1999 | Baggett | |
| 6,126,122 | A * | 10/2000 | Ismert | 24/271 |
| 2004/0052572 | A1* | 3/2004 | Peters | 402/60 |

* cited by examiner

*Primary Examiner*—Robert J. Sandy
(74) *Attorney, Agent, or Firm*—Berenato, White & Stavish, LLC

(57) ABSTRACT

A fastener system for binding paper is disclosed comprising a base having spaced first and second ends. A first prong extends from the first end. A second prong extends from the second end. A first member having a first opening receives the first prong, and a second member having a second opening receives the second prong. The first and second members are releasably securable to form a top lock. A method of securing a stack of papers is also disclosed.

26 Claims, 3 Drawing Sheets

10
30
22
26
18
20
12

18
38
58
39
20
54
60
56

FASTENER SYSTEM AND METHOD FOR BINDING PAPERS

FIELD OF THE INVENTION

A fastener system for binding paper is disclosed comprising a base having spaced first and second ends. A first prong extends from the first end. A second prong extends from the second end. A first member having a first opening receives the first prong. A second member having a second opening receives the second prong. The first and second members are releasably securable to form a top lock. A method of securing a stack of papers is also disclosed.

BACKGROUND OF THE INVENTION

Various devices for binding sheets of paper are known in the art. Some designs include a pair of prongs that are inserted through spaced holes along an edge of a sheet of paper. A stack of papers may be inserted onto the prongs. A portion of each prong extends beyond the stack of papers, and is bent over the stack of paper. Some designs include a top piece, wherein the prongs are bent over the top piece. Other deigns include a ratchet mechanism that binds the edges of the paper. Unfortunately, pages bound by such prior art devices often become loose or fall out, particularly if pages are repeatedly removed and/or inserted.

SUMMARY OF THE INVENTION

A fastener system for binding papers includes a base having spaced first and second ends. A first prong extends from the first end. A second prong extends from the second end. A first member having a first opening receives the first prong, and a second member having a second opening receives the second prong. The first and second members are releasably securable to form a top lock.

A fastener system for binding papers comprises a U-shaped member having a base and first and second prongs extending from the base. A first L-shaped member having a first tubular leg with a longitudinally extending opening receives the first prong. The first L-shaped member also has a second leg. A second L-shaped member having a second tubular leg with a longitudinally extending opening receives the second prong. The second L-shaped member also has a second leg, which is releasably securable to the second leg of the first L-shaped member.

A method of securing a stack of papers comprises the following steps: providing a base having spaced first and second ends with a first prong extending from the first end and a second prong extending from the second end; passing the prongs through spaced holes along an edge of at least one sheet of paper; providing a first member having a first opening for receiving the first prong and a second member having a second opening for receiving the second prong; passing the first prong through the first opening; passing the second prong through the second opening; and releasably securing the first and second members together to form a top lock.

DETAILED DESCRIPTION OF THE INVENTION

Figure 1:
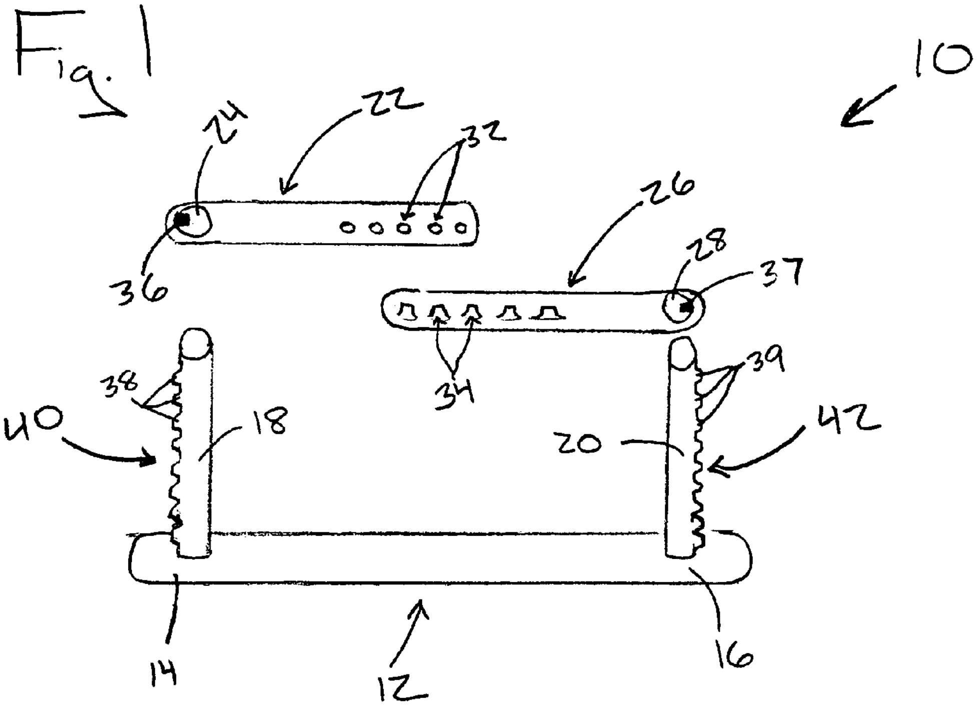
FIG. 1 is a perspective view of a fastener system according to a first embodiment of the present invention.

As best shown in FIG. 1, a fastener system 10 according to one embodiment of the present invention comprises a base 12 having spaced first and second ends 14, 16. A first prong 18 extends from first end 14, and a second prong 20 extends from second end 16. Base 12 and first and second prongs 18, 20 may be formed from plastic or metal. Prongs 18, 20 may be formed separately, and then secured or adhered to base 12. Alternatively, base 12 and prongs 18, 20 may be integrally formed, such as by injection molding.

Prongs 18, 20 may be substantially perpendicular to base 12, and substantially parallel to each other. Prongs 18, 20 may be either relatively rigid, or flexible. Prongs 18, 20 are spaced for receiving spaced holes punched along an edge of a sheet of paper. For example, prongs 18, 20 may be spaced from each other a distance of about 2.5 inches, which is a standard spacing distance for conventional paper hole punch devices. However, the spacing of prongs 18, 20 may vary.

Figure 2:
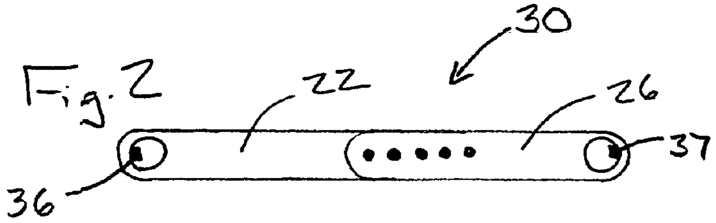
FIG. 2 is a top plan view of a top lock according to the first embodiment.

Fastener system 10 further comprises a first member 22 having a first opening 24 for receiving first prong 18, and a second member 26 having a second opening 28 for receiving second prong 20. First and second members 22, 26 are releasably securable to form a top lock 30, as best shown in FIG. 2.

Figure 3:
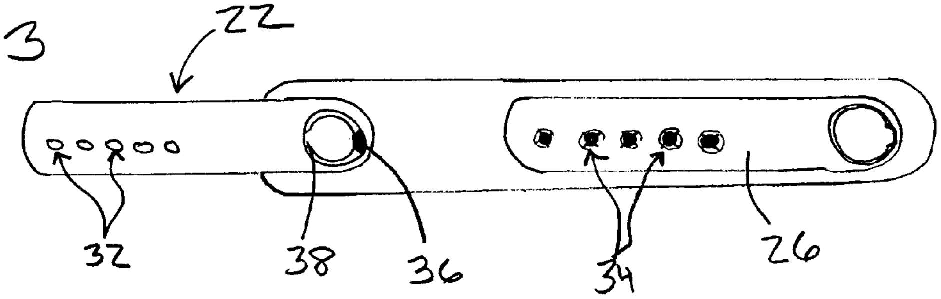
FIG. 3 is a top plan view of the fastener system according to the first embodiment.

First member 22 may include a plurality of apertures 32 spaced from first opening 24, as best shown in FIGS. 1 and 3. Apertures 32 are positioned longitudinally along first member 22. Second member 26 may include one or more projections 34 spaced from second opening 28, and extending longitudinally along second member 26. Projections 34 are releasably securable within apertures 32 to form top lock 30, as best shown in FIG. 2. Each projection 34 may be received within any one of apertures 32. In this way, the length of top lock 30 is adjustable depending on the apertures 32 selected for receiving projections 34. Top lock 30 is preferably formed of plastic, and is preferably relatively flexible. The configuration of apertures 32 and projections 34 may be similar to the adjustable strap on a baseball cap. As such, the length of top lock 30 may be easily adjusted and readjusted.

Figure 4:
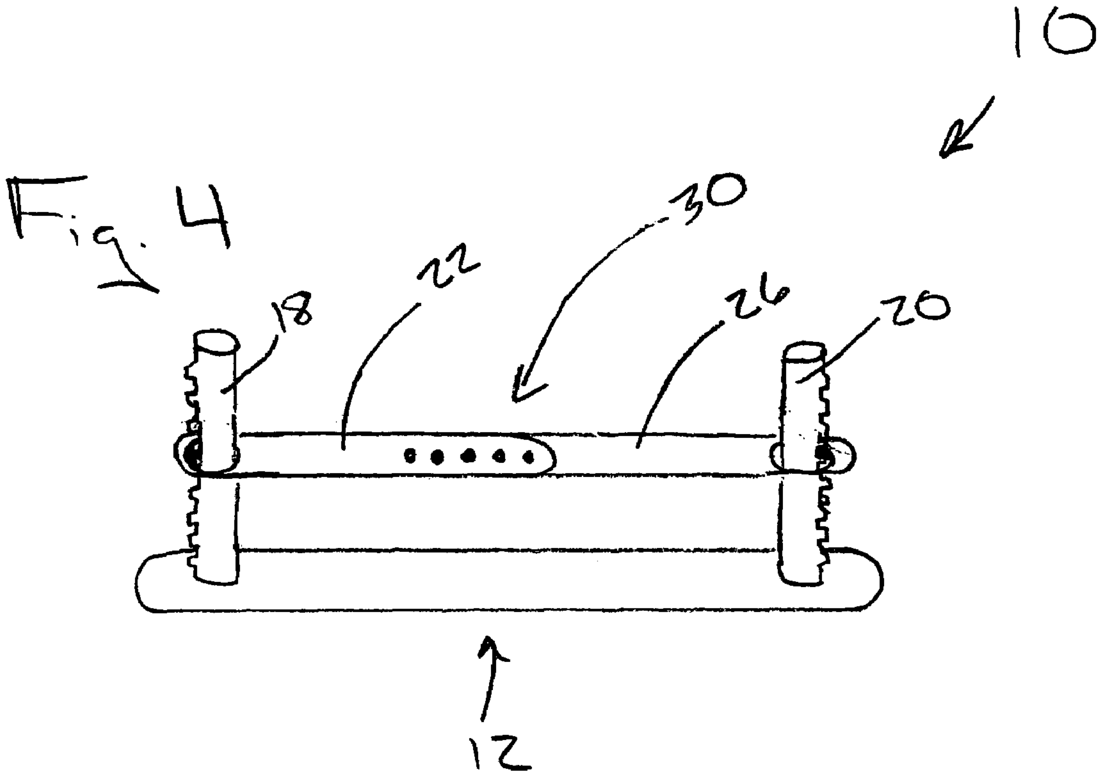
FIG. 4 is a perspective view of the fastener system according to the first embodiment with the top lock secured to the prongs.

First and second members 22, 26 may include protrusions 36, 37 extending into openings 24, 28, respectively. Prongs 18, 20 may include teeth 38, 39 extending longitudinally along their outwardly facing sides 40, 42, respectively. When securing first member 22 to prong 18, protrusion 36 should not contact teeth 38 when passing prong 18 through opening 24, as best shown in FIG. 3. Likewise, when securing second member 26 to prong 20, protrusion 37 should not contact teeth 39 when passing prong 20 through opening 28. First and second members 22, 26 may be pushed onto prongs 18, 20 until a desired position is reached. Protrusions 36, 37 and teeth 38, 39 may be resiliently deformable so that first and second members 22, 26 securely fit on prongs 18, 20. Then, first and second members 22, 26 are rotated around prongs 18, 20 until apertures 32 align with projections 34. Protrusions 36, 37 also engage teeth 38, 39, locking first and second members 22, 26 in the desired position on prongs 18, 20, as best shown in FIG. 4. Projections 34 may then be secured within apertures 32 to form top lock 30. If desired, prongs 18, 20 may be trimmed to a desired length.

Apertures 32 and projections 34 on top lock 30 may be easily unsnapped, similar to unsnapping the connecting straps on a baseball cap. Protrusions 36, 37 and teeth 38, 39 may then be easily unlocked by rotating first and second members around prongs 18, 20 so that protrusions 36, 37 disengage teeth 38, 39. First and second members 22, 26 may then be repositioned on prongs 18, 20, or removed from prongs 18, 20. In this way, pages may be easily removed from, or added to, fastener 10.

Figure 5:
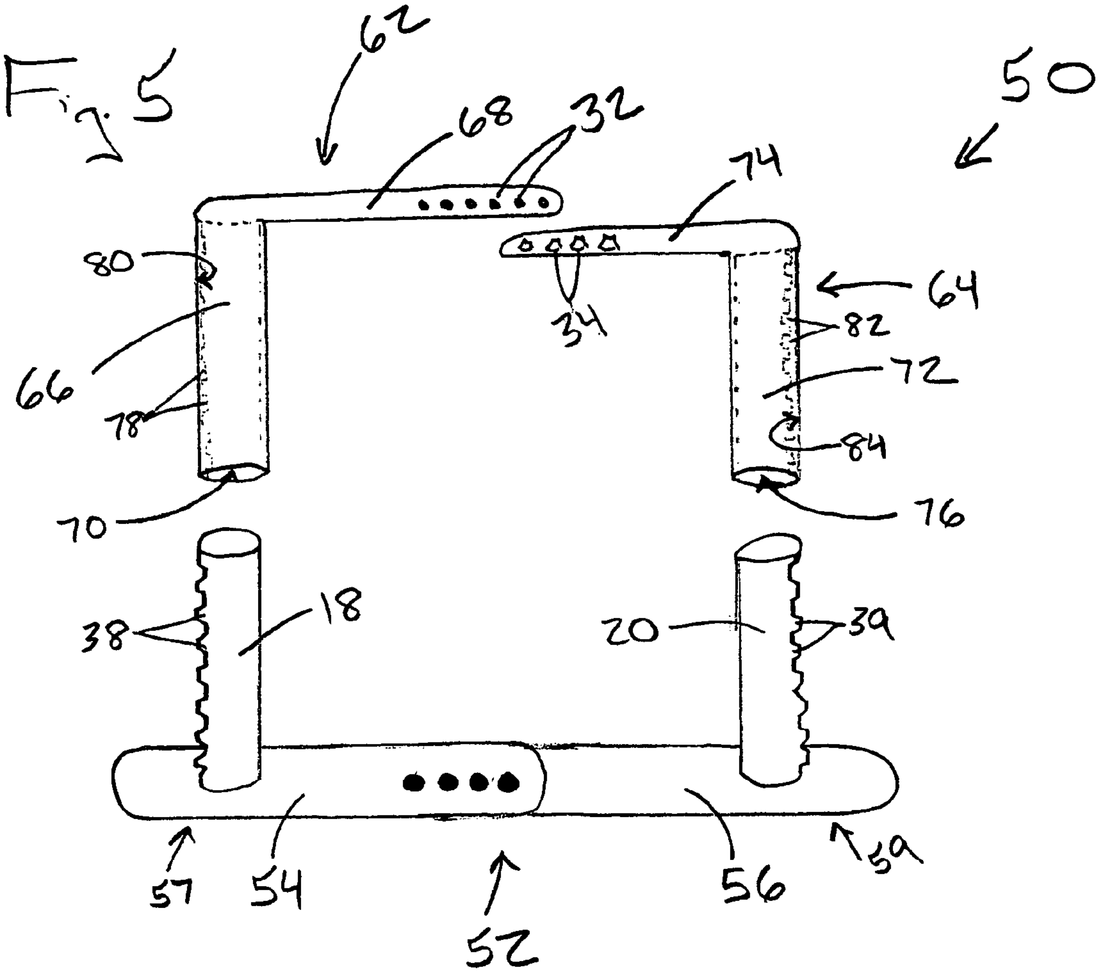
FIG. 5 is a perspective view of a fastener system according to a second embodiment.

A fastener system 50 according to another embodiment is best shown in FIG. 5. Fastener system 50 includes an adjustable base 52. Adjustable base 52 comprises a first portion 54 that is releasably securable to a second portion 56. First and second portions 54, 56 may be secured to form adjustable base 52.

Figure 6:
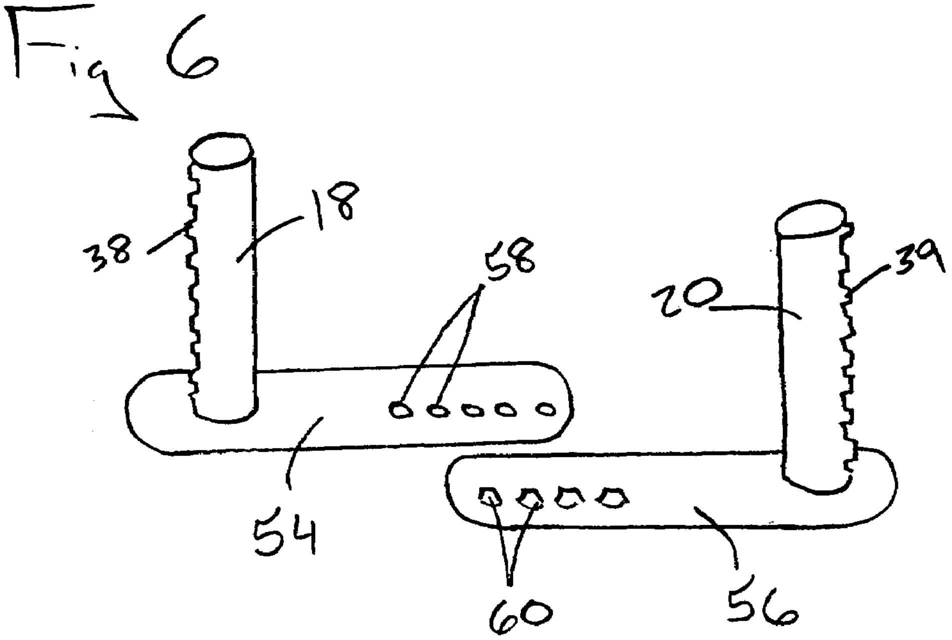
FIG. 6 is a perspective view of unsecured first and second portions of the base from the second embodiment.

As best shown in FIG. 6, first portion 54 may include a plurality of apertures 58 spaced from prong 18. Second portion 56 may include one or more projections 60 releasably securable within apertures 58. In this way, the length of base 52 may be adjusted depending on which apertures 58 receive projections 60. First portion 54 includes prong 18 extending from end 57, and second portion 56 includes prong 20 extending from end 59.

Fastener system 50 may also include a first L-shaped member 62 and a second L-shaped member 64, as best shown in FIG. 5. First L-shaped member 62 includes a first tubular leg 66 and a second leg 68. First tubular leg 68 is hollow, with an opening 70 extending longitudinally therethrough for receiving first prong 18. Second L-shaped member 64 includes a second tubular leg 72 and a second leg 74. Second tubular leg 72 is hollow, with an opening 76 extending therethrough for receiving second prong 20.

A plurality of protrusions 78 extend inwardly relative to opening 70, and longitudinally along an inner surface 80 of first tubular leg 66. Likewise, a plurality of protrusions 82 extend inwardly relative to opening 76, and longitudinally along an inner surface 84 of second tubular leg 72. Protrusions 78, 82 releasably engage teeth 38, 39 on prongs 18, 20.

Second leg 68 of first L-shaped member 62 may include a plurality of apertures 32. Second leg 74 of second L-shaped member 64 may include one or more projections 34, which may be releasably secured within apertures 86 as described above.

When securing first and second L-shaped members 62, 64 to prongs 18, 20, openings 70, 76 are aligned with prongs 18, 20. Protrusions 78, 82 should not be aligned with teeth 38, 39 when initially pushing prongs 18, 20 through openings 70, 76. Protrusions 78, 82 and teeth 38, 39 may be resiliently deformable so that first and second L-shaped members may securely fit on prongs 18, 20. After first and second L-shaped members 62, 64 are positioned on prongs 18, 20 at a desired distance from base 52, first and second L-shaped members 62, 64 may be rotated about prongs 18, 20 until apertures 32 and projections 34 are aligned. Protrusions 78, 82 thereby engage teeth 38, 39, locking first and second L-shaped members 62, 64 in the desired position. If desired, first and second L-shaped members 62, 64, and prongs 18, 20, may be trimmed to a desired length.

Similar to fastener system 10, apertures 32 and projections 34 may be easily unsnapped for adjustment or removal of first and second L-shaped members 62, 64. Protrusions 78, 82 may then be disengaged from teeth 38, 39 by simply rotating first and second L-shaped members 62, 64 around prongs 18, 20 until protrusions 78, 82 are not in contact with teeth 38, 39.

In another embodiment, top lock 30 may be used in conjunction with adjustable base 52. Alternatively, first and second L-shaped members 62, 64 may be used in conjunction with base 12.

Figure 7:
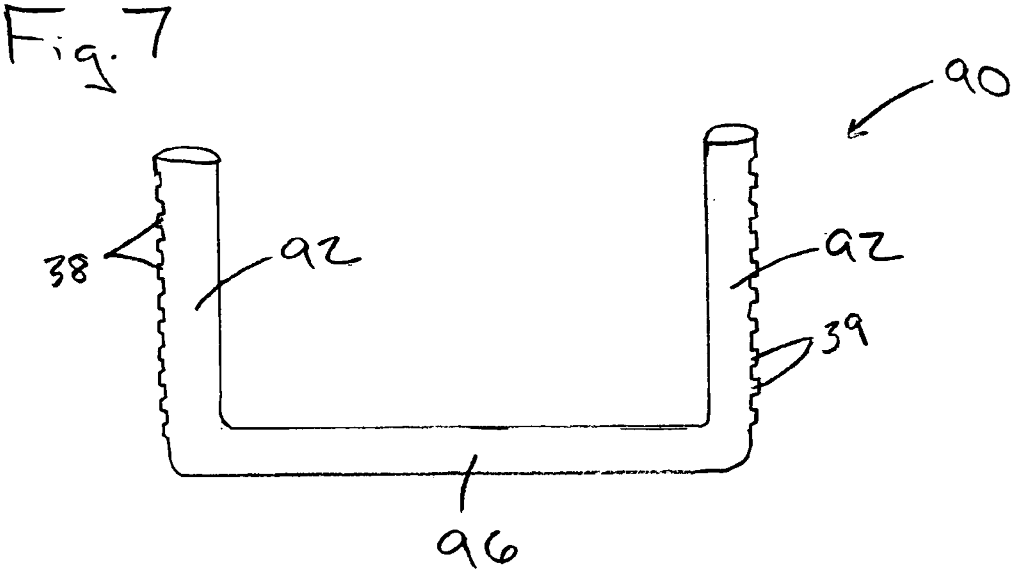
FIG. 7 is a perspective view of a base according to another embodiment of the present invention.

In another embodiment, a U-shaped base 90 is provided, as best shown in FIG. 7. Base 90 includes integral prong portions 92, 94 and a lower portion 96, and functions the same as base 12. Thus, hole-punched paper is received on prong portions 92, 94. Either top lock 30, or first and second L-shaped members 62, 64, may be used in conjunction with U-shaped base 90. Thus, prong portions 92, 94 include teeth 38, 39, as described above.

Certain aspects of the present invention have been explained according to various embodiments. However, it will be apparent to one of ordinary skill in the art that various modifications and variations may be made in construction or configuration of these embodiments without departing from the scope or spirit of the invention. Thus, it is intended that the present invention include all such modifications and variations, provided they come within the scope of the following claims and their equivalents.

The invention claimed is:

1. A fastener system for binding paper, comprising:

a base having spaced first and second ends;

a first prong extending from said first end;

a second prong extending from said second end;

a first member having a first opening for receiving said first prong, said first member including at least one aperture spaced from said first opening; and a second member having a second opening for receiving said second prong, said second member including at least one projection spaced from said second opening, said projection releasably securable within said aperture so that said first and second members form a top lock.

2. The fastener of claim 1, wherein each of said first and second prongs includes a side having a teeth extending therefrom.

3. The fastener of claim 2, wherein each of said first and second openings includes an inwardly extending protrusion for releasably engaging said teeth, thereby releasably securing said first and second members at a selected distance from said base.

4. The fastener of claim 1, wherein said first member includes a plurality of spaced apertures.

5. The fastener of claim 4, wherein said second member includes a plurality of spaced projections, each of said projections releasably securable within one of said apertures.

6. The fastener of claim 1, wherein said base comprises a first portion and a second portion, said first and second portions releasably securable to form an adjustable base.

7. The fastener of claim 6, wherein said first portion further comprises a plurality of apertures spaced from said first end.

8. The fastener of claim 7, wherein said second portion further comprises at least one projection releasably securable within one of said apertures.

9. The fastener of claim 1, wherein said base is plastic.

10. The fastener of claim 1, wherein said top lock is plastic.

11. The fastener of claim 1, wherein said top lock is a flexible strap.

12. The fastener of claim 1, wherein said first and second prongs are flexible.

13. A fastener system for binding papers, comprising:

a U-shaped member having a base and first and second prongs extending from said base;

a first L-shaped member having an first tubular leg with a longitudinally extending opening for receiving said first prong, and a second leg having at least one aperture; and a second L-shaped member having a second tubular leg with a longitudinally extending opening for receiving said second prong, and a second leg having at least one projection releasably securable within said aperture of so that said first and second L-shaped members form a top lock.

14. The fastener of claim 13, wherein said first and second prongs include teeth longitudinally extending along a side of each of said prongs.

15. The fastener of claim 14, wherein each of said first and second tubular legs includes protrusions longitudinally extending inwardly relative to said opening for releasably engaging said teeth.

16. The fastener of claim 15, wherein said second leg of said first L-shaped member includes a plurality of spaced apertures.

17. The fastener of claim 16, wherein said second leg of said second L-shaped member includes a plurality of spaced projections, each of said projections releasably securable within one of said apertures.

18. The fastener of claim 17, wherein said top lock is flexible.

19. The fastener of claim 17, wherein said top lock has an adjustable length.

20. The fastener of claim 13, wherein said U-shaped member is plastic.

21. The fastener of claim 13, wherein said first and second L-shaped members are plastic.

22. A method of securing a stack of papers, comprising the steps of:

providing a base having spaced first and second ends with a first prong extending from the first end and a second prong extending from the second end;

passing the prongs through spaced holes along an edge of at least one sheet of paper;

providing a first member having a first opening for receiving the first prong and a second member having a second opening for receiving the second prong;

passing the first prong through the first opening;

passing the second prong through the second opening; and releasably securing the first and second members together to form a top lock while adjusting the length of the top lock.

23. The method of claim 22, including the steps of:

providing a protrusion extending into the first opening;

rotating the first member until the protrusion engages teeth on the first prong, wherein the protrusion releasably locks to maintain the first member at a selected distance from the base.

24. The method of claim 23, including the steps of:

providing a protrusion extending into the second opening;

rotating the second member until the protrusion engages teeth on the second prong, wherein the protrusion releasably locks to maintain the second member at a selected distance from the base.

25. The method of claim 22, including the further steps of:

providing a base having a first portion releasably securable to a second portion;

securing the first and second portions to form an adjustable base having a selectable length.

26. The method of claim 22, including the step of trimming the prongs to a selected length.

* * * * *